Dec. 29, 1925.
F. S. HYLAND
GRINDER
Filed March 24, 1920
1,567,442
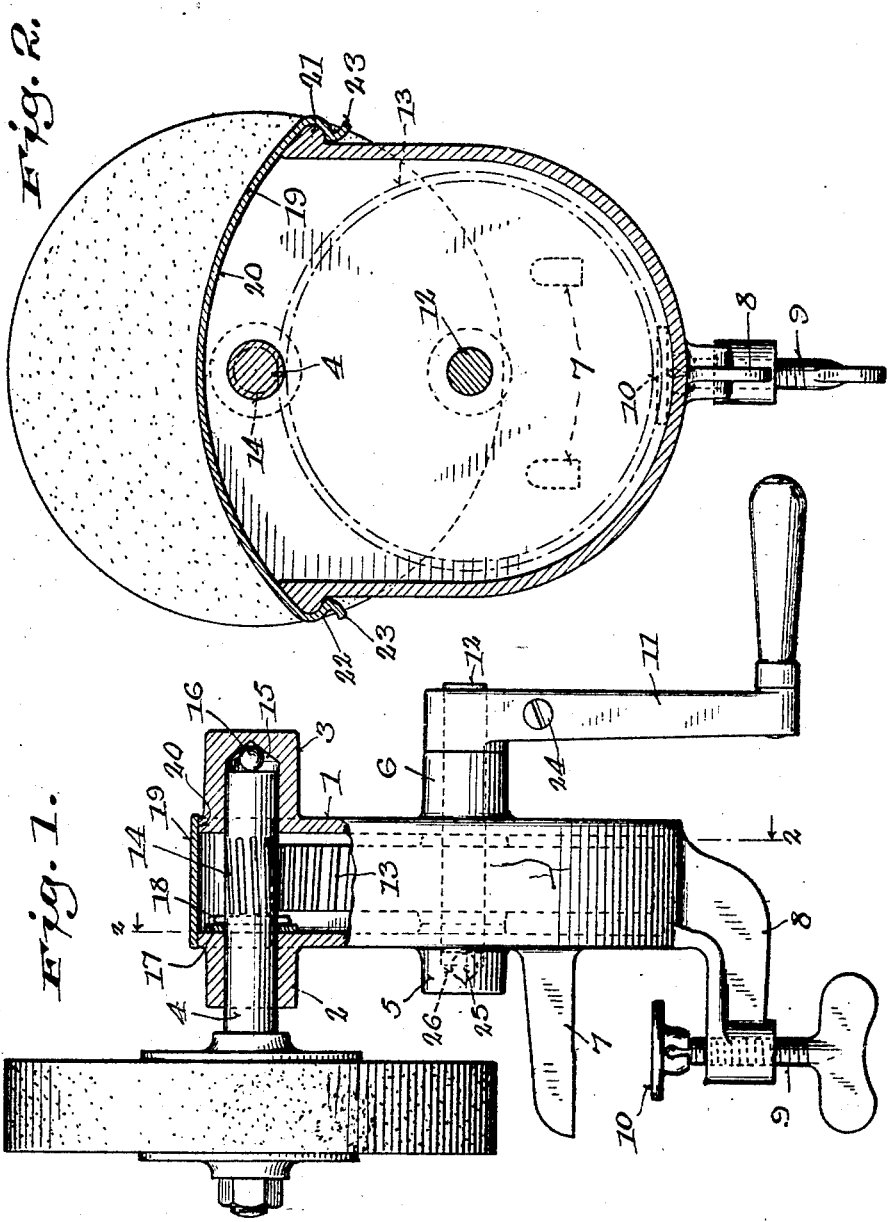
Inventor
Frank S. Hyland,
By Erwin Wheeler & Woolard
Attorneys.

Patented Dec. 29, 1925.

1,567,442

UNITED STATES PATENT OFFICE.

FRANK S. HYLAND, OF MILWAUKEE, WISCONSIN, ASSIGNOR TO PRAIRIE DU CHIEN TOOL CO., OF PRAIRIE DU CHIEN, WISCONSIN, A CORPORATION OF WISCONSIN.

GRINDER.

Application filed March 24, 1920. Serial No. 368,225.

*To all whom it may concern:*

Be it known that I, FRANK S. HYLAND, a citizen of the United States, residing at Milwaukee, county of Milwaukee, and State of Wisconsin, have invented new and useful Improvement in Grinders, of which the following is a specification.

This invention relates to grinders.

Objects of this invention are to provide a grinder in which the casing is made of one integral piece thruout the major portion of its extent, in which simple means are provided for closing the opening in the casing without the use of screws or bolts, and in which the bearing for the grinding wheel spindle is made in one integral piece, and in which the bearing for the driving wheel is made in one integral piece.

In the drawings:

Fig. 1 is a side elevation partly in section, and

Fig. 2 is a section on the line 2—2 of Fig. 1.

The casing 1 is an integral casting and includes the upper bearings 2 and 3 for the grinding wheel spindle 4, the bearings 5 and 6 for the crank shaft, the feet 7, and the clamping screw supporting arm 8. The clamping screw 9 has the usual swivel top 10 which is adapted to bear upon the bottom part of the shelf or table upon which the feet 7 rest.

The crank 11 is fastened upon a shaft 12 which projects thru the casing and has a forced fit with the large spiral gear 13. The bearing 5 is closed at its outer end and is provided with a cone-shaped recess 26. Within this cone-shaped recess a hardened steel ball 25 is positioned and serves as a thrust bearing for the end of the shaft 12 which projects into the bearing 5.

The pinion 14 which meshes with the gear 13 is formed by milling out portions of the shaft 4 so that the teeth are formed integrally with the shaft 4 and the resulting pinion is of the same diameter as the shaft 4. By keeping the outer diameter of the pinion 14 the same as the diameter of the shaft 4, it is possible to insert the shaft 4 into the casing thru the bearing 2 thereby eliminating the necessity of a split bearing.

The spindle 4 is carried in the bearing members 2 and 3, the member 3 being closed at its end and having a cone-shaped recess 15 formed therein in which is mounted a hardened steel ball 16. The thrust which the spiral gears produce is axially of the spindle 4 and is borne by the ball 16. To prevent the shaft 4 from sliding outwardly towards the grinding wheel side, a collar 17 is positioned upon the shaft and is retained upon such shaft by the split pin or cotter pin 18 which passes thru a hole in the shaft 4.

The open top of the casing 1 is closed by means of an arcuate spring strap or plate 19 which exactly conforms when in position to the upper curved edges 20 of the casing 1. A pair of ears 21 are formed integrally with the casing 1 adjacent each of its upper side edges and are adapted to cooperate with hook-shaped ears 22 formed by a bent portion of the spring strap or plate 20, such spring cover 20 tending to press the ears 22 inwardly and thereby holding such ears 22 in close engagement with the ears 21. Outwardly turned portions 23 may be formed upon the spring member 20 at the lower portion of the ears 22 to facilitate the removal of such spring cap or plate 20.

In assembling this grinder, the large gear 13 is slipped into the casing 1 thru its open upper end, the ball 16 is dropped into the socket 15, and the spindle 4 is slid thru the bearing 2 thru a collar 17 and into the bearing 3. The pin 18 is next inserted in the hole thru the shaft 4. The ball 25 is dropped into the recess 26 and the shaft 12 is now passed thru the bearing 6, the large gear 13 and the bearing 5, such shaft having a forced fit with the large gear 13. The crank 11 is next fastened upon the shaft 12 in any suitable manner, for example, by tightening the clamping screw 24 which may be arranged to cause portions of the crank 11 to tightly grip the shaft 12.

It will thus be seen that a simple form of thrust bearing has been provided for the shaft 4 and that the general design of grinder has been very much simplified by providing a casing with an open portion such portion being covered by means of an arcuate resilient strip or cap which is adapted to snap into place, thereby eliminating the use of screws or bolts as in the old type of casing for grinders. It will be further seen that a grinder has been provided which has a casing forming a closed pocket for the retention of oil or grease and therefore free from danger of leaking of the lubricant.

I claim:—

1. In a grinder, the combination with a gear casing having a transversely extending main opening solely at the top provided with side walls marginally arched and a lug adjacent each end of said opening, of a spring cover conformable to said margins and bent adjacent each end to provide a hook portion engageable about a corresponding lug.

2. In a grinder, the combination with a gear casing having a transversely extending main opening solely at the top provided with side walls marginally arched and a lug adjacent each end of said opening, of a cover adapted to fit said margins and including resiliently yieldable hook members projecting at its ends and each engageable with a lug.

3. In a grinder, the combination of an integral gear casing having complete front and rear walls, and an open top, and a spring cap member for closing said open top.

4. In a grinder, the combination of an integral gear casing having a main opening solely at the top, and a spring cover for closing said open top, said cover and casing having co-operating means for locking said top in position.

5. A grinder comprising a grinding wheel, a spindle therefor, a driving crank, gearing operatively connecting said crank and spindle, an integral casing for said gearing having bearings therein for said spindle, one of said bearings having an integral closed end, said casing having an opening solely at the top, and a spring cover for said opening.

6. A grinder comprising a grinding wheel, a spindle therefor, a pinion upon said spindle, a driving gear in mesh with said pinion, a driving shaft carrying said driving gear, a gear casing having integral front, rear, and bottom walls, and having integral bearings for both the spindle and the driving shaft, one of said bearings having an integrally formed closed end.

In testimony whereof I affix my signature.

FRANK S. HYLAND.